US011818793B2

(12) United States Patent
Sirotkin et al.

(10) Patent No.: US 11,818,793 B2
(45) Date of Patent: Nov. 14, 2023

(54) DEVICES AND METHODS FOR UE-SPECIFIC RAN-CN ASSOCIATIONS

(71) Applicant: Apple Inc., Cupertino, CA (US)

(72) Inventors: Alexander Sirotkin, Tel-Aviv (IL); Alexandre Saso Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/615,054

(22) PCT Filed: Jun. 12, 2018

(86) PCT No.: PCT/US2018/037108
§ 371 (c)(1),
(2) Date: Nov. 19, 2019

(87) PCT Pub. No.: WO2018/236624
PCT Pub. Date: Dec. 27, 2018

(65) Prior Publication Data
US 2020/0169865 A1    May 28, 2020

Related U.S. Application Data

(60) Provisional application No. 62/521,954, filed on Jun. 19, 2017.

(51) Int. Cl.
*H04W 8/08*    (2009.01)
*H04W 76/11*   (2018.01)
(Continued)

(52) U.S. Cl.
CPC .............. *H04W 8/08* (2013.01); *H04L 67/34* (2013.01); *H04W 8/26* (2013.01); *H04W 60/005* (2013.01);
(Continued)

(58) Field of Classification Search
None
See application file for complete search history.

(56) References Cited

U.S. PATENT DOCUMENTS

2013/0208702 A1* 8/2013 Sandberg .......... H04W 36/0077
370/331
2015/0257012 A1    9/2015 Zhang
(Continued)

FOREIGN PATENT DOCUMENTS

CN    105122855    12/2015
WO    2016144245    9/2016

OTHER PUBLICATIONS

Cisco Systems et al: "Addressing editor's notes in S2-172812", SA WG2 Meeting #S2-121; Hangzhou, P.R. China; 3GPP Draft; S2-173528, 3rd Generation Partnership Project (3GPP), Mobile Competence Centre ; 650, Route Des Lucioles ; F-06921 Sophia-Antipolis Cedex ; France. May 19, 2017. 8 pages.
(Continued)

*Primary Examiner* — Derrick W Ferris
*Assistant Examiner* — Keith Follansbee
(74) *Attorney, Agent, or Firm* — Kowert, Hood, Munyon, Rankin & Goetzel, P.C.

(57) ABSTRACT

Devices, methods, user equipment (UE), base stations, storage media, and other embodiments are provided for managing associations in a communication network. In one example embodiment, a Next Generation (NG) core network device is configured for an Access and Mobility Management Function (AMF) with an NG-Radio Access Network (NG-RAN) node. The network device may be configured to access a plurality of Transport Network Link (TNL) associations and generate an AMF configuration update using the TNL associations, the AMF configuration update comprising AMF transport layer address information for the plurality of TNL associations. The network device may then
(Continued)

initiate transmission of the AMF configuration update comprising the AMF transport layer address information to the NG-RAN node. Additional embodiments may involve binding updates or setup response messaging for managing associations, along with additional operations.

23 Claims, 14 Drawing Sheets

(51) Int. Cl.
| | | |
|---|---|---|
| *H04L 29/12* | (2006.01) | |
| *H04L 29/08* | (2006.01) | |
| *H04W 8/26* | (2009.01) | |
| *H04W 60/00* | (2009.01) | |
| *H04W 80/02* | (2009.01) | |
| *H04L 67/00* | (2022.01) | |
| *H04L 101/663* | (2022.01) | |

(52) U.S. Cl.
CPC ............ *H04W 76/11* (2018.02); *H04W 80/02* (2013.01); *H04L 2101/663* (2022.05)

(56) References Cited

U.S. PATENT DOCUMENTS

| | | | |
|---|---|---|---|
| 2017/0006648 A1 | 1/2017 | Aronius | |
| 2018/0270743 A1* | 9/2018 | Callard | ................... H04L 45/64 |
| 2019/0208555 A1* | 7/2019 | Zee | ........................ H04W 76/12 |
| 2020/0029322 A1* | 1/2020 | Yu | ......................... H04W 28/16 |

OTHER PUBLICATIONS

Vodafone: "Thoughts on virtualisation I stickiness on N2 and flexibility on N11/N16/N9"; SA WG2 Meeting #119; Busan, South Korea; 3GPP Draft; S2-172292 N2 Virtualisation, 3rd Generation Partnership Project (3GPP), Mobile. Mar. 31, 2017. 5 pages.
European Search Report in EP application No. 18820667.6-1213 dated Jul. 10, 2020, 11 Pages.
"3GPP; Technical Specification Group Services and System Aspects; System Architecture for the 5G System; Stage 2(Release 15)", 3GPP TS 23.501 V1.0.0, (Jun. 1, 2017).
"3GPP; TS GRAN; NG-RAN; NG Application Protocol (NGAP)(Release 15)", 3GPP TS 38.413 V0.1.0, (Jun. 15, 2017).
"International Application Serial No. PCT/US2018/037108, International Search Report dated Sep. 21, 2018", 3 pgs.
"International Application Serial No. PCT/US2018/037108, Written Opinion dated Sep. 21, 2016", 6 pgs.
CATT, "TS23.501: Update to AMF functional description", S2-173225, SA WG2 Meeting #121, Hangzhou, China, (May 9, 2017).
Nokia, et al., "TS 23.501: Way forward and Solution for change of AMF / Control of N2 persistence", S2-173151, SA WG2 Meeting #121, Hangzhou, China, (May 9, 2017).
Office Action for CN Application No. 201880032988.6; dated Dec. 25, 2022.

* cited by examiner

DEVICES AND METHODS FOR UE-SPECIFIC RAN-CN ASSOCIATIONS

PRIORITY CLAIM

This application is a U.S. National Stage Filing under 35 U.S.C. 371 from International Application No. PCT/US2018/037108, filed Jun. 12, 2018 and published in English as WO 2018/236624 on Dec. 27, 2018, which claims the benefit of priority to U.S. Provisional Patent Application Ser. No. 62/521,954 filed Jun. 19, 2017, and titled "STAGE-3 FOR NG-C PERSISTENCE CONTROL OF UE-SPECIFIC RAN-CN ASSOCIATIONS," each of which is incorporated herein by reference in its entirety.

TECHNICAL FIELD

Embodiments pertain to systems, methods, and component devices for wireless communications, and particularly to device access and associated operations in Third Generation Partnership Project (3GPP) communication systems.

BACKGROUND

Long-term evolution (LTE) and LTE-Advanced are standards for wireless communication information (e.g., voice and other data) for user equipment (UE) such as mobile telephones. Such systems operate with UEs communicating with a network via cells of radio access technology (RAT) systems with radio area networks (RANs) which may include base station systems such as evolved node Bs (eNBs) or next generation node Bs (gNBs) for providing an initial wireless connection to the larger system. As part of managing connections between the system and UEs, network systems may manage persistence control of associations with RAN devices and UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or to substituted for, those of other embodiments. Embodiments set forth in the claims encompass all available equivalents of those claims.

Figure 1:
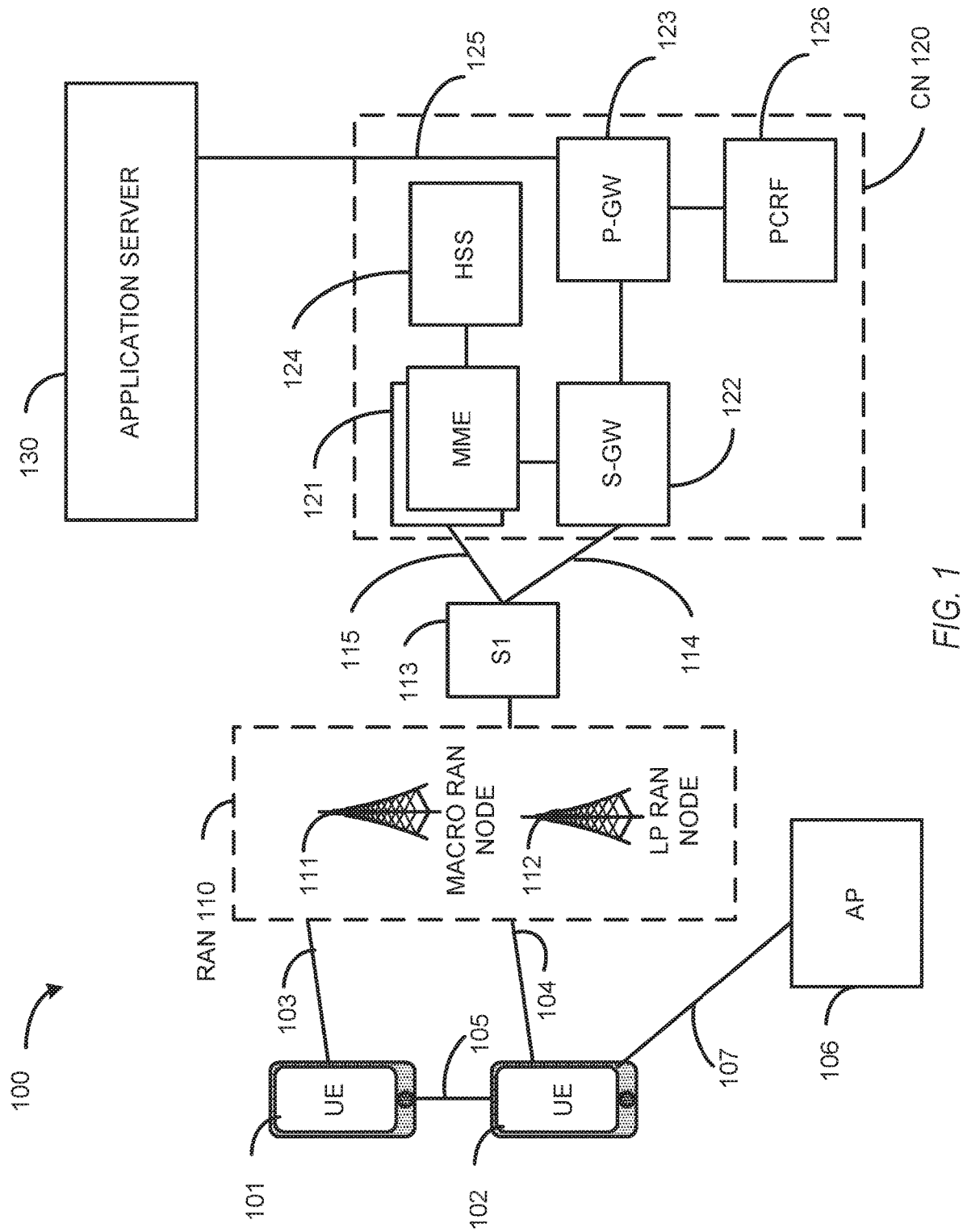
FIG. 1 is a diagram of a wireless network, in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long-Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via a connection 107. The connection 107 can comprise a local wireless connection, such as a connection consistent with any IEEE 802.11 protocol, wherein the AP 106 would comprise a Wi-Fi® router. In this example, the AP 106 may be, for example, connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., a macro RAN node 111, and one or more RAN nodes for providing femtocells or picocells (e.g., cells having smaller coverage areas, smaller user capacity, or higher bandwidth compared to macrocells). e.g., a low-power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single-Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH, among other things. It may also inform the UEs 101 and 102 about the transport format, resource allocation, and Hybrid Automatic Repeat Request (H-ARQ) information related to the uplink shared channel. Typically, downlink scheduling (e.g., assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Like the CCEs described above, each ECCE may correspond to nine sets of four physical resource elements known as enhanced resource element groups (EREGs). An ECCE may have other numbers of EREGs in some situations.

The RAN 110 is shown to be communicatively coupled to a core network (CN) 120 via an S1 interface 113. In some embodiments, the CN 120 may be an evolved packet core (EPC) network, a NextGen Packet Core (NPC) network, or some other type of CN. In this embodiment, the S1 interface 113 is split into two parts: an S1-U interface 114, which carries traffic data between the RAN nodes 111 and 112 and a serving gateway (S-GW) 122, and an S1-mobility management entity (MME) interface 115, which is a signaling interface between the RAN nodes 111 and 112 and MMEs 121.

In this embodiment, the CN 120 comprises the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network and external networks such as a network including an application server 130 (alternatively referred to as an application function (AF)) via an Internet Protocol (IP) communications interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to the application server 130 via the IP communications interface 125. The application server 130 can also be configured to support one or more communication services (e.g., Voice over Internet Protocol (VoIP) sessions, PTT sessions, group communication sessions, social networking services, etc.) for the UEs 101 and 102 via the CN 120.

The P-GW 123 may further be a node for policy enforcement and charging data collection. A Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class identifier (QCI), which commences the QoS and charging as specified by the application server 130.

In some systems a next generation (NG) core network (e.g., the CN 120) may include a virtualized environment. Network Functions Virtualization (NFV) is one example of such a virtualized environment. NG core network systems in a virtualized environment, and associated NG control plane (e.g. NG-C or N2) persistence control, may use new virtualized resources, such as virtualized Access and Mobility Management Function (AMF) resources, which may be instantiated or brought down frequently.

In existing architectures, there is a notion of a mobility management entity (MME) pool. An MME pool is a set of discrete MMEs that share in common the same service area (e.g., each MME in the pool is capable of handling any UEs that are currently roaming within the common service area). The reason for grouping MMEs together in a pool is to increase the processing power in the service area. Such grouping is used when the UE population in a service area grows beyond the capacity of a single MME machine.

NFV achieves a similar goal to that of the MME pool, with the difference that processing power can be added progressively in a very granular manner, contrary to today's MME pools where processing power is added in discrete quantities.

As each AMF resource may have a separate IP address, some embodiments operate where the AMF supports multiple transport network layer (TNL) associations (e.g., internet protocol (IP) addresses for a network device) and has the capability to control which TNL associations (e.g. addresses) are used for which UEs by the gNB. As used herein, AMF may generally refer to an access and mobility management function, or some other term that would be recognized by one skilled in the art. Some NG-C systems described herein operate with support for multiple TNL associations in next generation (NG) interface management procedures, support for TNL binding update, and support for TNL binding release.

Figure 2:
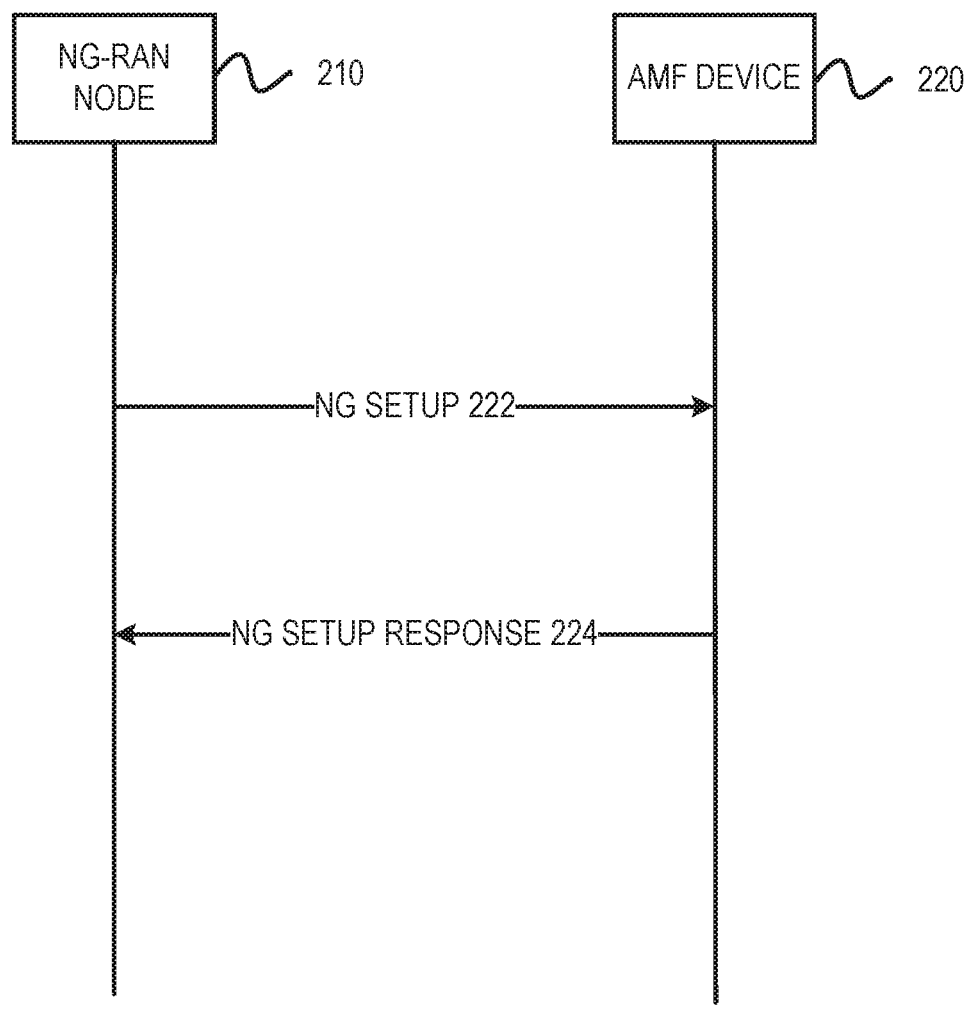
FIG. 2 describes aspects of communications between a RAN and a network device in accordance with some embodiments described herein.

FIG. 2 describes aspects of communications between a RAN and a network device in accordance with some embodiments described herein. FIG. 2 includes an NG-RAN node 210 (e.g., the macro RAN node 111, the LP RAN node 112, or any other such node of a RAN such as the RAN 110) and an AMF device 220, which may be processing circuitry of any device of a core network used for AMF, including circuitry running the CN 120, circuitry of a RAN collocated with core network circuitry, or any other such circuitry used in a communication system for AMF.

In embodiments described herein, new communications for UE-specific RAN-CN associations are described. In some embodiments, multiple TNL associations per AMF are supported with new signaling. An AMF can support multiple TNL associations; however, only one will be used for NG interface setup. In other words, at least one TNL address of the AMF needs to be preconfigured in the gNB, and if multiple TNL addresses are available, the gNB uses one of them to establish the first TNL association to the AMF and to set up the NG interface.

Pre-configuration of all AMF TNL addresses (e.g., via operations and management (OAM) function) is possible, but since AMF TNL addresses may change over time rather dynamically, embodiments described herein provide a benefit of allowing the AMF to update the list of TNL associations. Some embodiments described herein use amended NG SETUP RESPONSE and AMF CONFIGURATION UPDATE NG-AP messages to carry TNL associations lists of the AMF. Below we provide an example of NG-AP signaling in accordance with embodiments described herein.

An NG SETUP RESPONSE message 224 is generated and sent by the AMF device 220 in response to an NG SETUP 222 message from the NG-RAN node 210 to transfer application layer information for an NG-C interface instance.

Table 1 below illustrates information elements (IEs) which may be included in an example NG setup response. These include a new TNL Associations List IE which includes the information on the TNL addresses available for use by the NG-RAN node 210 and UEs served by the NG-RAN node 210.

TABLE 1

| IE/Group Name | Presence | Range | IE type and reference | Semantics description | Criticality | Assigned Criticality |
|---|---|---|---|---|---|---|
| Message Type | M | | <ref> | | YES | reject |
| AMF Name | O | | PrintableString (SIZE(1 . . . 150, . . .)) | FFS | YES | ignore |
| AMF pool and AMF code related information | M | | <ref> | | GLOBAL | reject |
| Relative AMF Capacity | M | | <ref> | | YES | ignore |
| AMF Slice Support | O | FFS | The structure of this IE is FFS. | Configured slices in the AMF. | YES | ignore |
| TNL Associations List | M | 1 . . . <maxnoofTNLAssociations> | | | | |
| >TNL Information | M | | TNL Information <ref> | | | |

Figure 3:
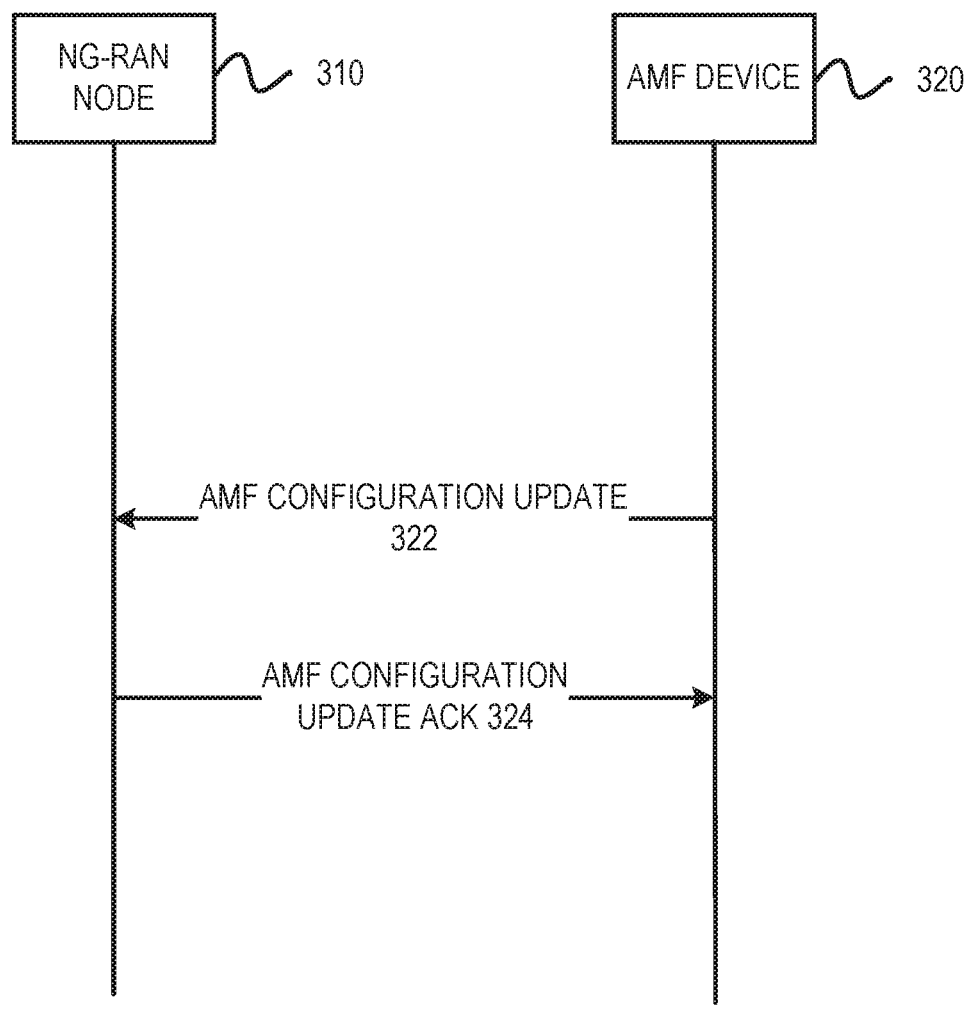
FIG. 3 describes aspects of communications between a RAN and a network device in accordance with some embodiments described herein.

FIG. 3 describes aspects of communications between a RAN and a network device in accordance with some embodiments described herein. FIG. 3 includes an NG-RAN node 310 (e.g., the macro RAN node 111, the LP RAN node 112, or any other such node of a RAN such as the RAN 110) and an AMF device 320, similar to the system of FIG. 2.

An AMF CONFIGURATION UPDATE message 322 is sent by the AMF device 320 to transfer updated information for an NG-C interface instance. The AMF CONFIGURATION UPDATE message 322 is initiated by the AMF device 320, and an AMF CONFIGURATION UPDATE ACK message 324 is generated and sent by the NG-RAN node 310 or some other element of the RAN or an associated UE in response to the AMF CONFIGURATION UPDATE message 322.

Table 2 below illustrates information elements (IEs) which may be included in an example AMF CONFIGURATION UPDATE. These include a new TNL Associations List to Add or TNL Address to Add IE, a TNL Associations List To Remove or TNL Addresses To Remove IE, and associated TNL information and TNL identifier (ID) IEs. These include information on changes to the TNL addresses available to the NG-RAN and its nodes.

Figure 4:
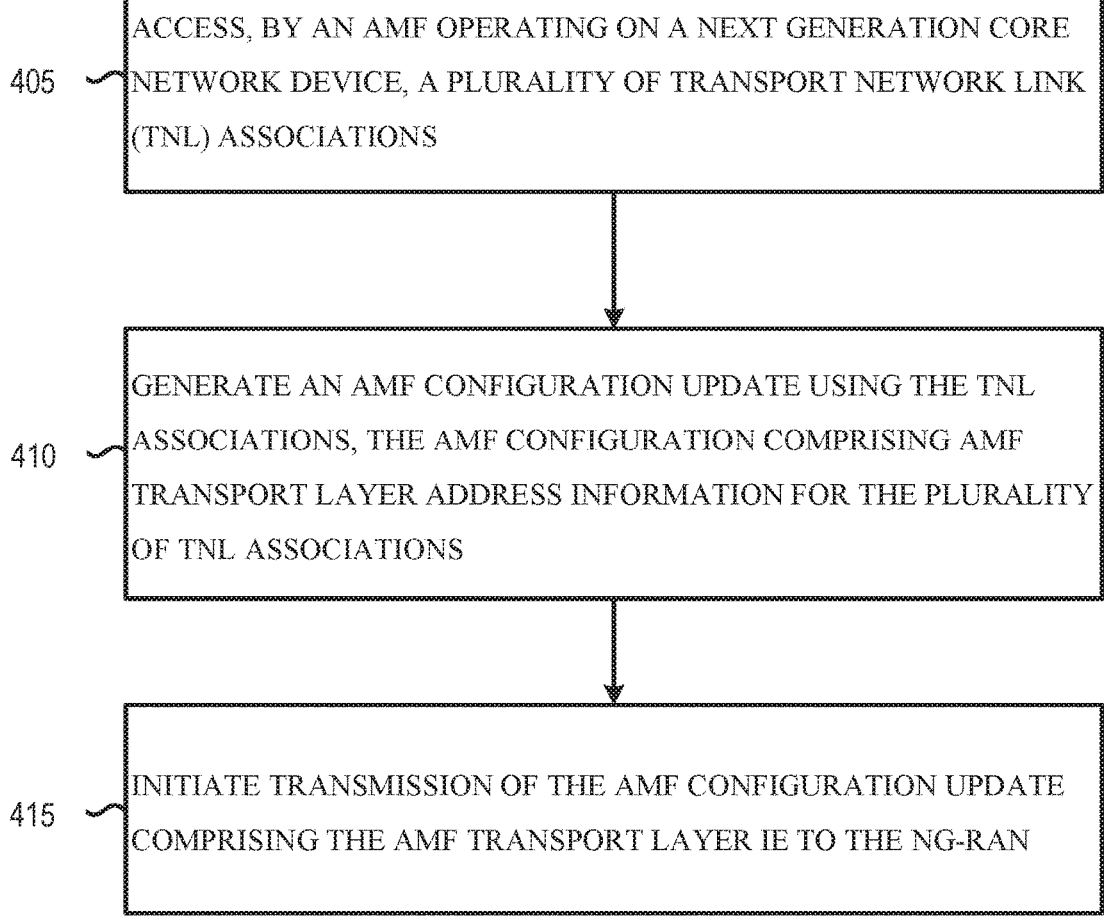
FIG. 4 describes a method for RAN associations in accordance with some embodiments.

FIG. 4 illustrates an example method 400 performed by an AMF device (e.g., the AMF device 320), in accordance with embodiments described herein. In some embodiments, the method 400 of FIG. 4 may be implemented by one or more processors of a device or an apparatus of any machine that includes processing circuitry. Such operations may be within a virtualization implementation of an AMF operating on the AMF device of a communication system. In other embodiments, the method 400 may be implemented as computer-readable instructions in a storage medium that, when executed by one or more processors of a device, cause the device to perform the method 400. One embodiment may be an apparatus of a Next Generation (NG) core network device configured for an Access and Mobility Management Function (AMF) with an NG-Radio Access Network (NG-RAN) node, the apparatus comprising components such as processing circuitry, memory, interfaces, transmission circuitry, or other such circuit elements.

The method 400 includes operation 405 to access a plurality of Transport Network Link (TNL) associations; operation 410 to generate an AMF configuration update using the TNL associations, the AMF configuration update comprising AMF transport layer address information for the

TABLE 2

| IE/Group Name | Presence | Range | IE type and reference | Semantics description | Criticality | Assigned Criticality |
|---|---|---|---|---|---|---|
| Message Type | M | | <ref> | | YES | reject |
| AMF Name | O | | PrintableString(SIZE(1 . . . 150, . . .)) | | YES | ignore |
| AMF Slice Support | O | FFS | The structure of this IE is FFS. | Configured slices in the AMF. | YES | ignore |
| TNL Associations List To Add | M | 1 . . . <maxnoofTNLAssociations> | | | | |
| >TNL Information | M | | TNL Information <ref> | | | |
| TNL Associations List To Remove | M | 1 . . . <maxnoofTNLAssociations> | | | | |
| >TNL ID | M | | TNL ID <ref> | | | | plurality of TNL associations; and operation 415 to initiate transmission of the AMF configuration update comprising the AMF transport layer address information to the NG-RAN node.

As described above, such operations avoid limiting the system to preconfigured AMF associations and addresses, and allow the AMF to initiate change configurations, whereas prior systems are limited to RAN-initiated changes or preconfigured addresses.

Additional embodiments may operate in which the AMF transport layer address information comprises an AMF Transport Layer Associations To Add information element (IE) and/or an AMF Transport Layer Address To Remove information element (IE).

In some such embodiments, the NG-RAN selects a TNL address from the plurality of TNL associations to set up an NG interface with the NG core network device. The NG-RAN may thus select from the multiple associations provided by the message from the AMF device.

Further, as described above, some embodiments may also use an initial NG setup prior to the configuration update. In such embodiments, operations to set up the associations may include operations by the AMF device circuitry to decode an NG setup message from the NG-RAN; generate an NG setup response message, the NG setup response message comprising an initial set of TNL associations for addresses available to UEs served by the NG-RAN; initiate communication of the NG setup response message to the NG-RAN; and identify an updated list of available addresses as the set of TNL associations for the AMF configuration update message. In some embodiments, the AMF configuration update message is sent by the AMF to transfer updated information for an NG control plane interface instance (e.g. N2).

Figure 5:
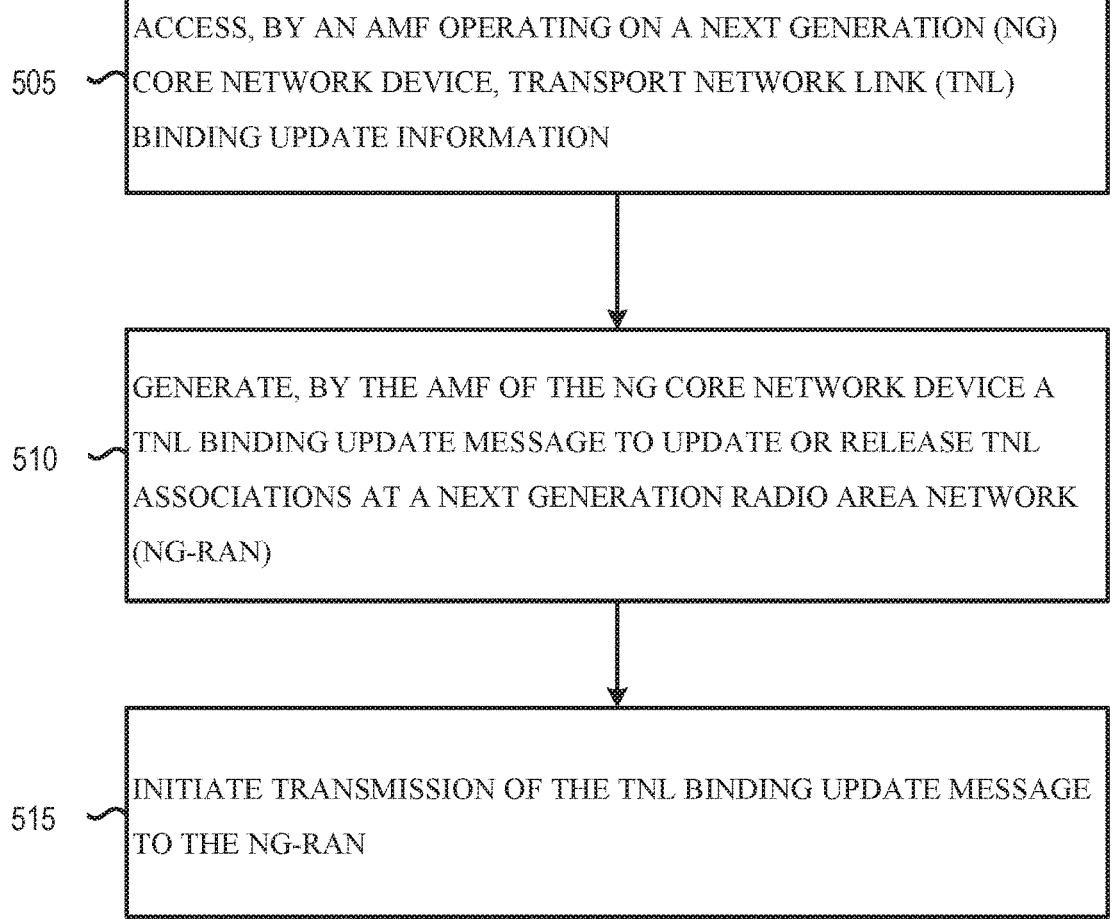
FIG. 5 describes a method for RAN associations in accordance with some embodiments.

FIG. 5 illustrates an example method 500 performed by an AMF device (e.g., the AMF device 220 or 320, CN 120, etc.), in accordance with embodiments described herein. In some embodiments, the method 500 of FIG. 5 may be implemented by one or more processors of a device or an apparatus of any machine that includes processing circuitry. Such operations may be within a virtualization implementation of an AMF operating on the AMF device of a communication system. In other embodiments, the method 500 may be implemented as computer-readable instructions in a storage medium that, when executed by one or more processors of a device, cause the device to perform the method 500. One embodiment may be an apparatus of a Next Generation (NG) core network device configured for an Access and Mobility Management Function (AMF) with an NG-Radio Access Network (NG-RAN) node, the apparatus comprising components such as processing circuitry, memory, interfaces, transmission circuitry, or other such circuit elements.

The method 500 particularly relates to a change in TNL binding to for the system, requested by the AMF. Generally, there are two options to consider for TNL binding changes: definition of new dedicated NG-AP messages or piggybacking on some of the existing procedures. In various embodiments, the AMF is able to update the TNL binding at any time in a connection management (CM) Connected state. The system cannot assume that some of the other NG-AP procedures will be running at exactly the same time when an AMF needs to update or release a binding. Because of this, embodiments introduce a new NG-AP procedure with associated messaging and information elements. Table 3 illustrates an example TNL BINDING UPDATE message with associated IEs for the message, and table 4 illustrates an example IE for TNL information.

TABLE 3

| IE/Group Name | Presence | Range | IE type and reference | Semantics description | Criticality | Assigned Criticality |
|---|---|---|---|---|---|---|
| Message Type | M | | <ref> | | YES | reject |
| AMF UE NGAP ID | M | | <ref> | | YES | ignore |
| gNB UE NGAP ID | M | | <ref> | | YES | ignore |
| TNL Redirection | O | | TNL ID <ref> | | | |
| TNL Associations List To Remove | M | 1 . . . <maxnoofTNLAssociations> | | | | |
| >TNL ID | M | | TNL ID <ref> | | | |

TABLE 4

| IE/Group Name | Presence | Range | IE type and reference | Semantics description |
|---|---|---|---|---|
| TNL Information | M | | BIT STRING (SIZE(1 . . . 160, . . .)) | |
| TNL ID | M | | INTEGER | |

The method 500 illustrates an example method of using messaging and IEs such as those described above for managing TNL bindings by an AMF device. The method 500 begins with operation 505 to access, by an AMF operating as part of a device in an NG core network device, TNL binding information. Then in operation 510, the AMF of the NG-C device generates a TNL binding update to update or release TNL associations, and in operation 515, the AMF of the NG core network device initiates communication of the TNL binding update to the NG-RAN node.

In various such embodiments, the TNL binding update comprises a TNL information element such as the ID of table 4, and in some such embodiments, the TNL information element comprises one or more IP addresses. Some such embodiments may operate where the TNL binding update comprises a request to the NG-RAN node to release a first TNL binding for a first UE.

The methods describe particular embodiments, but it will be apparent that additional methods, in accordance with the embodiments described herein, are possible with repeated or intervening operations. For example, various embodiments of operations at a RAN, a gNB, a network device, and a UE are described above, and it will be apparent that corresponding operations at elements of a communication network other than those specifically described (e.g., operations at a gNB or UE associated with described operations at a network device implementing AMF) will occur in conjunction with the described operations. Further still, any embodiments described above may be performed with repeated operations or intervening operations in various different embodiments. Any of these operations may additionally involve generation or processing of communications, information elements, and/or fields described above in addition to the particular communications, information elements, and fields of the above methods. An additional set of non-exhaustive embodiments is to further presented below.

EXAMPLE EMBODIMENTS

Example 1 may include a gNB connected to a 5G Core Network, configured to receive a plurality of transport network link (TNL) addresses from an AMF.

Example 2 may include the gNB of Example 1 or some other example herein, configured to receive the plurality of TNL addresses in an NG SETUP RESPONSE NG-AP message.

Example 3 may include the gNB of Example 1 or some other example herein, configured to receive the plurality of TNL addresses in an AMF CONFIGURATION UPDATE NG-AP message.

Example 4 may include the gNB of Example 2 or Example 3 or some other example herein, configured to receive a message from the AMF carrying an indication about which TNL addresses are to be released.

Example 5 may include the gNB of Examples 2, 3, or 4 or some other example herein, further configured to receive a dedicated NG-AP message with a list of AMF TNL addresses to be used and/or a list of AMF TNL addresses to be released.

Example 6 may include an apparatus comprising means to perform one or more elements of a method described in or related to any of Examples 1-5, or any other method or process described herein.

Example 7 may include one or more non-transitory computer-readable media comprising instructions to cause an electronic device, upon execution of the instructions by one or more processors of the electronic device, to perform one or more elements of a method described in or related to any of Examples 1-5, or any other method or process described herein.

Example 8 may include an apparatus comprising logic, modules, or circuitry to perform one or more elements of a method described in or related to any of Examples 1-5, or any other method or process described herein.

Example 9 may include a method, technique, or process as described in or related to any of Examples 1-5, or portions or parts thereof.

Example 10 may include an apparatus comprising one or more processors and one or more computer-readable media comprising instructions that, when executed by the one or more processors, cause the one or more processors to perform the method, techniques, or process as described in or related to any of Examples 1-5, or portions thereof.

Example 11 may include a signal as described in or related to any of Examples 1-5, or portions or parts thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Example 16 is an apparatus of a Next Generation (NG) core network device configured for an Access and Mobility Management Function (AMF) with an NG-Radio Access Network (NG-RAN) node, the apparatus comprising: processing circuitry configured to: access a plurality of Transport Network Link (TNL) associations; generate an AMF configuration update using the TNL associations, the AMF configuration update comprising AMF transport layer address information for the plurality of TNL associations; and initiate transmission of the AMF configuration update comprising the AMF transport layer address information to the NG-RAN node; and an interface coupled to the processing circuitry configured to communicate the AMF configuration update from the processing circuitry to the NG-RAN node.

In Example 17, the subject matter of Example 16 optionally includes wherein the AMF transport layer address information comprises an AMF Transport Layer Associations To Add information element (IE).

In Example 18, the subject matter of any one or more of Examples 16-17 optionally include wherein the AMF transport layer address information comprises an AMF Transport Layer Associations To Remove information element (IE).

In Example 19, the subject matter of any one or more of Examples 16-18 optionally include wherein the NG-RAN node selects a TNL address from the plurality of TNL associations to set up an NG interface with the NG core network device.

In Example 20, the subject matter of any one or more of Examples 16-19 optionally include wherein the processing circuitry is further configured to: decode an NG setup message from the NG-RAN node; generate an NG setup response message, the NG setup response message comprising an initial set of TNL associations for addresses available to UEs served by the NG-RAN node; initiate communication of the NG setup response message to the NG-RAN node; and identify an updated list of available addresses as the plurality of TNL associations for the AMF configuration update.

In Example 21, the subject matter of any one or more of Examples 16-20 optionally include wherein the NG-RAN node comprises an NG node B (gNB).

In Example 22, the subject matter of any one or more of Examples 16-21 optionally include wherein the AMF configuration update is sent by the AMF to transfer updated information for a next generation control plane (NG-C) interface instance.

In Example 23, the subject matter of any one or more of Examples 16-22 optionally include wherein the processing circuitry is further configured to: generate a TNL binding update to update or release TNL associations; and initiate communication of the TNL binding update to the NG-RAN node.

In Example 24, the subject matter of Example 23 optionally includes wherein the TNL binding update comprises a TNL information element.

In Example 25, the subject matter of Example 24 optionally includes wherein the TNL information element comprises one or more Internet Protocol (IP) addresses.

In Example 26, the subject matter of any one or more of Examples 23-25 optionally include wherein the TNL binding update comprises a request to the NG-RAN node to release a first TNL binding for a first UE.

In Example 27, the subject matter of any one or more of Examples 16-26 optionally include further comprising a memory coupled to the processing circuitry, the memory configured to store the plurality of TNL associations.

Example 28 is a computer-readable storage medium comprising instructions that, when executed by one or more processors of a Next Generation (NG) core network device, cause the NG core network device to perform operations for an Access and Mobility Management Function (AMF) in communication with an NG-Radio Access Network (NG-RAN) node, the operations configuring the NG core network device to: access a plurality of Transport Network Link (TNL) associations, the plurality of TNL associations comprising addresses available to the NG-RAN node; generate an AMF configuration update using the TNL associations, the AMF configuration update comprising AMF transport layer address information for the plurality of TNL associations; and initiate transmission of the AMF configuration update comprising the AMF transport layer address information to the NG-RAN node.

In Example 29, the subject matter of Example 28 optionally includes wherein the operations further configure the NG core network device to: generate a TNL binding update to update or release TNL associations; and initiate communication of the TNL binding update to the NG-RAN node, wherein the TNL binding update comprises a request to the NG-RAN node to release a first TNL binding for a first UE.

In Example 30, the subject matter of any one or more of Examples 28-29 optionally include wherein the AMF transport layer address information comprises an AMF Transport Layer Associations To Add information element (IE).

In Example 31, the subject matter of any one or more of Examples 28-30 optionally include wherein the AMF transport layer address information comprises an AMF Transport Layer Associations To Remove information element (IE).

Example 32 is an apparatus of a Next Generation (NG) core network device configured for an Access and Mobility Management Function (AMF) with an NG-Radio Access Network (NG-RAN) node, the apparatus comprising: processing circuitry configured to: decode an NG setup message from the NG-RAN node; generate an NG setup response message, the NG setup response message comprising an initial set of TNL associations for addresses available to UEs served by the NG-RAN node; and initiate communication of the NG setup response message to the NG-RAN node; and a memory configured to store the initial set of TNL associations for addresses available to UEs served by the NG-RAN node.

In Example 33, the subject matter of Example 32 optionally includes wherein the processing circuitry is further configured to: identify an updated list of available addresses as TNL associations for an AMF configuration update message; generate the AMF configuration update using the TNL associations, the AMF configuration update comprising AMF transport layer address information for the TNL associations; and initiate transmission of the AMF configuration update comprising the AMF transport layer address information to the NG-RAN node.

In Example 34, the subject matter of any one or more of Examples 32-33 optionally include wherein the NG setup response message comprises a TNL Associations List information element (IE).

In Example 35, the subject matter of Example 34 optionally includes wherein the NG setup response message further comprises a TNL Associations List To Add IE, and a TNL Associations List To Remove IE.

In Example 36, the subject matter of any one or more of Examples 33-35 optionally include wherein the AMF transport layer address information comprises an AMF Transport Layer Associations To Add information element (IE).

Example 37 is an apparatus of a Next Generation (NG) core network device configured for an Access and Mobility Management Function (AMF) with an NG-Radio Access Network (NG-RAN) node, the apparatus comprising: processing circuitry configured to: determine a binding update associated with a first TNL binding for a first UE associated with the NG-RAN node; generate a TNL binding update to update or release TNL associations; and initiate communication of the TNL binding update to the NG-RAN node.

In Example 38, the subject matter of Example 37 optionally includes wherein the TNL binding update comprises one or more Internet Protocol (IP) addresses comprising at least a first IP address for the first UE.

Example 39 is an apparatus of a Next Generation (NG) core network device configured for an Access and Mobility Management Function (AMF) with an NG-Radio Access Network (NG-RAN) node, the apparatus comprising: means for accessing a plurality of Transport Network Link (TNL) associations; means for generating an AMF configuration update using the TNL associations, the AMF configuration update comprising AMF transport layer address information for the plurality of TNL associations; and means for initiating transmission of the AMF configuration update comprising the AMF transport layer address information to the NG-RAN node.

In Example 40, the subject matter of Example 39 optionally includes wherein the AMF transport layer address information comprises an AMF Transport Layer Associations To Add information element (IE).

In Example 41, the subject matter of any one or more of Examples 39-40 optionally include wherein the AMF transport layer address information comprises an AMF Transport Layer Associations To Remove information element (IE).

In Example 42, the subject matter of any one or more of Examples 39-41 optionally include wherein the NG-RAN node selects a TNL address from the plurality of TNL associations to set up an NG interface with the NG core network device.

In Example 43, the subject matter of any one or more of Examples 39-42 optionally include further comprising: means for decoding an NG setup message from the NG-RAN node; means for generating an NG setup response message, the NG setup response message comprising an initial set of TNL associations for addresses available to UEs served by the NG-RAN node; means for initiating communication of the NG setup response message to the NG-RAN node; and means for identifying an updated list of available addresses as the plurality of TNL associations for the AMF configuration update.

In Example 44, the subject matter of any one or more of Examples 39-43 optionally include wherein the NG-RAN node comprises an NG node B (gNB).

In Example 45, the subject matter of any one or more of Examples 39-44 optionally include wherein the AMF configuration update is sent by the AMF to transfer updated information for a next generation control plane (NG-C) interface instance.

In Example 46, the subject matter of any one or more of Examples 39-45 optionally include wherein the processing circuitry is further configured to: generate a TNL binding update to update or release TNL associations; and initiate communication of the TNL binding update to the NG-RAN node.

In Example 47, the subject matter of Example 46 optionally includes wherein the TNL binding update comprises a TNL information element.

In Example 48, the subject matter of Example 47 optionally includes wherein the TNL information element comprises one or more Internet Protocol (IP) addresses.

In Example 49, the subject matter of any one or more of Examples 46-48 optionally include wherein the TNL binding update comprises a request to the NG-RAN node to release a first TNL binding for a first UE.

In Example 50, the subject matter of Example 49 optionally includes further comprising a memory coupled to the processing circuitry, the memory configured to store the plurality of TNL associations.

Example 51 is a method performed by a Next Generation (NG) core network device for an Access and Mobility Management Function (AMF) in communication with an NG-Radio Access Network (NG-RAN) node, the method comprising: accessing a plurality of Transport Network Link (TNL) associations, the plurality of TNL associations comprising addresses available to the NG-RAN node; generating an AMF configuration update using the TNL associations, the AMF configuration update comprising AMF transport layer address information for the plurality of TNL associations; and initiating transmission of the AMF configuration update comprising the AMF transport layer address information to the NG-RAN node.

In Example 52, the subject matter of Example 51 optionally includes wherein the operations further configure the NG core network device to: generating a TNL binding update to update or release TNL associations; and initiating communication of the TNL binding update to the NG-RAN node; wherein the TNL binding update comprises a request to the NG-RAN node to release a first TNL binding for a first UE.

In Example 53, the subject matter of any one or more of Examples 51-52 optionally include wherein the AMF transport layer address information comprises an AMF Transport Layer Associations To Add information element (IE).

In Example 54, the subject matter of any one or more of Examples 51-53 optionally include wherein the AMF transport layer address information comprises an AMF Transport Layer Associations To Remove information element (IE).

Example 55 is an apparatus of a Next Generation (NG) core network device configured for an Access and Mobility Management Function (AMF) with an NG-Radio Access Network (NG-RAN) node, the apparatus comprising: means for decoding an NG setup message from the NG-RAN node; means for generating an NG setup response message, the NG setup response message comprising an initial set of TNL associations for addresses available to UEs served by the NG-RAN node; means for initiating communication of the NG setup response message to the NG-RAN node; and means for storing the initial set of TNL associations for addresses available to UEs served by the NG-RAN node.

In Example 56, the subject matter of Example 55 optionally includes wherein the processing circuitry is further configured to: means for identifying an updated list of available addresses as TNL associations for an AMF configuration update message, means for generating the AMF configuration update using the TNL associations, the AMF configuration update comprising AMF transport layer address information for the TNL associations; and means for initiating transmission of the AMF configuration update comprising the AMF transport layer address information to the NG-RAN node.

In Example 57, the subject matter of any one or more of Examples 55-56 optionally include wherein the NG setup response message comprises a TNL Associations List information element (IE).

In Example 58, the subject matter of Example 57 optionally includes wherein the NG setup response message further comprises a TNL Associations List To Add IE, and a TNL Associations List To Remove IE.

In Example 59, the subject matter of any one or more of Examples 57-58 optionally include wherein the AMF transport layer address information comprises an AMF Transport Layer Associations To Add information element (IE).

Example 60 is an apparatus of a Next Generation (NG) core network device configured for an Access and Mobility Management Function (AMF) with an NG-Radio Access Network (NG-RAN) node, the apparatus comprising: means for determining a binding update associated with a first TNL binding for a first UE associated with the NG-RAN node; means for generating a TNL binding update to update or release TNL associations; and means for initiating communication of the TNL binding update to the NG-RAN node.

In Example 61, the subject matter of Example 60 optionally includes wherein the TNL binding update comprises one or more Internet Protocol (IP) addresses comprising at least a first IP address for the first UE.

In Example 62, the subject matter of Example 61 optionally includes further comprising: radio frequency circuitry coupled to the processing circuitry; and one or more antennas coupled to the radio frequency circuitry and configured to receive the configuration communication from the base station.

In Example 63, the subject matter of Example 62 optionally includes wherein the one or more antennas are configured to receive a plurality of network beams; means for determining that a first network beam of the plurality of network beams has a highest measured signal and to initiate an indication associated with the first network beam to the base station; wherein the configuration communication is received via the first network beam until the UE receives a random access response (RAR) message.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

In addition to the above example embodiments, any combination of operations or elements described above may be integrated into various embodiments described herein. Additionally, other example embodiments may include any examples described above with the individual operations or device elements repeated or ordered with intervening elements or operations in any functional order.

Figure 6:
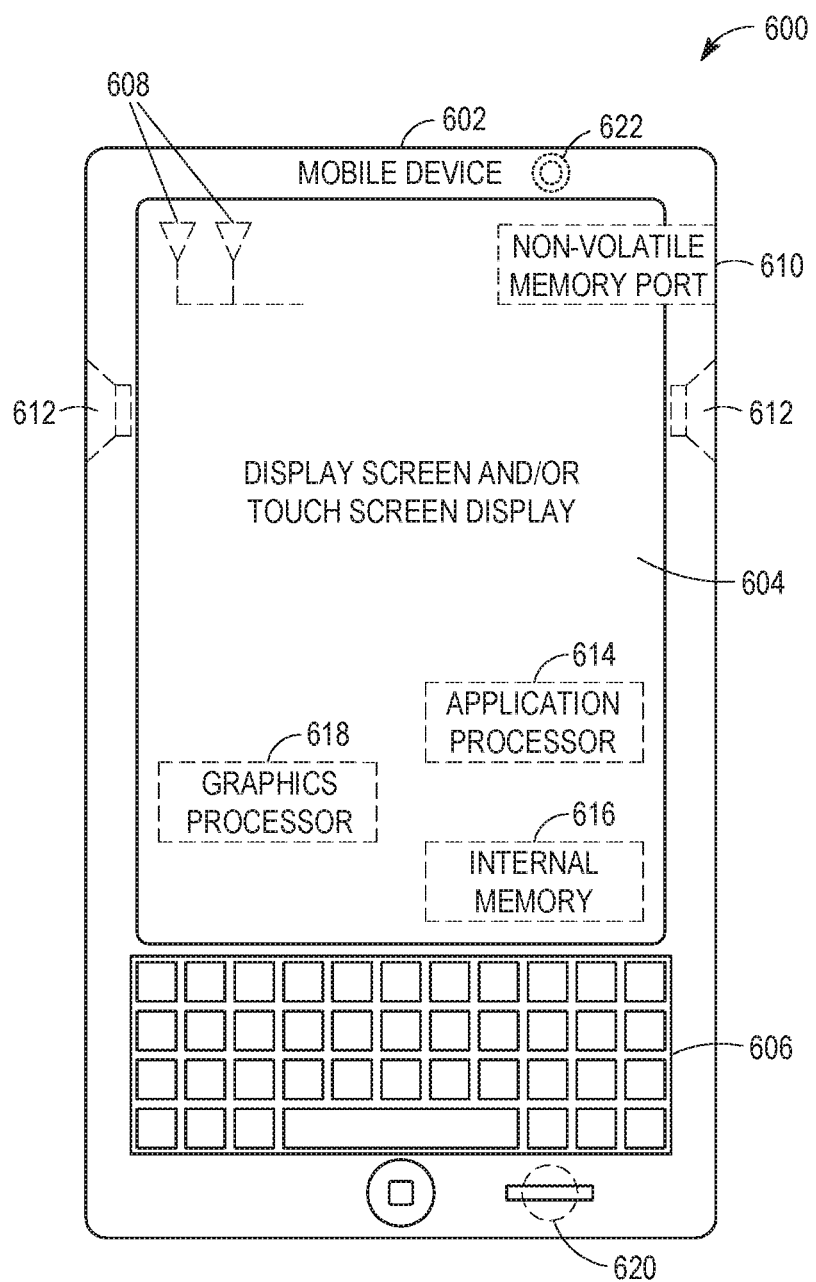
FIG. 6 illustrates an example UE, which may be configured for specialized operation or otherwise used with various embodiments described herein.

FIG. 6 shows an example UE 600. The UE 600 may be an implementation of the UEs 101, 102, or any other device described herein. The UE 600 can include one or more antennas 608 configured to communicate with a transmission station, such as a base station, an eNB/gNB, or another type of wireless wide area network (WWAN) access point. The UE 600 can communicate using separate antennas for each wireless communication standard or shared antennas for multiple wireless communication standards. The UE 600 can communicate in a wireless local area network (WLAN), a wireless personal area network (WPAN), and/or a WWAN.

FIG. 6 also shows a microphone 620 and one or more speakers 612 that can be used for audio input and output to and from the UE 600. As a headed device, the UE 600 includes one or more interfaces for a UI. The UE 600 particularly includes a display screen 604, which can be a liquid crystal display (LCD) screen or another type of display screen such as an organic light-emitting diode (OLED) display. The display screen 604 can be configured as a touch screen. The touch screen can use capacitive, resistive, or another type of touch-screen technology. An application processor 614 and a graphics processor 618 can be coupled to an internal memory 616 to provide processing and display capabilities. A non-volatile memory port 610 can also be used to provide data input/output (I/O) options to a user. The non-volatile memory port 610 can also be used to expand the memory capabilities of the UE 600. A keyboard 606 can be integrated with the UE 600 or wirelessly connected to the UE 600 to provide additional user input. A virtual keyboard can also be provided using the touch screen. A camera 622 located on the front (display screen 604) side or the rear side of the UE 600 can also be integrated into a housing 602 of the UE 600.

Figure 7:
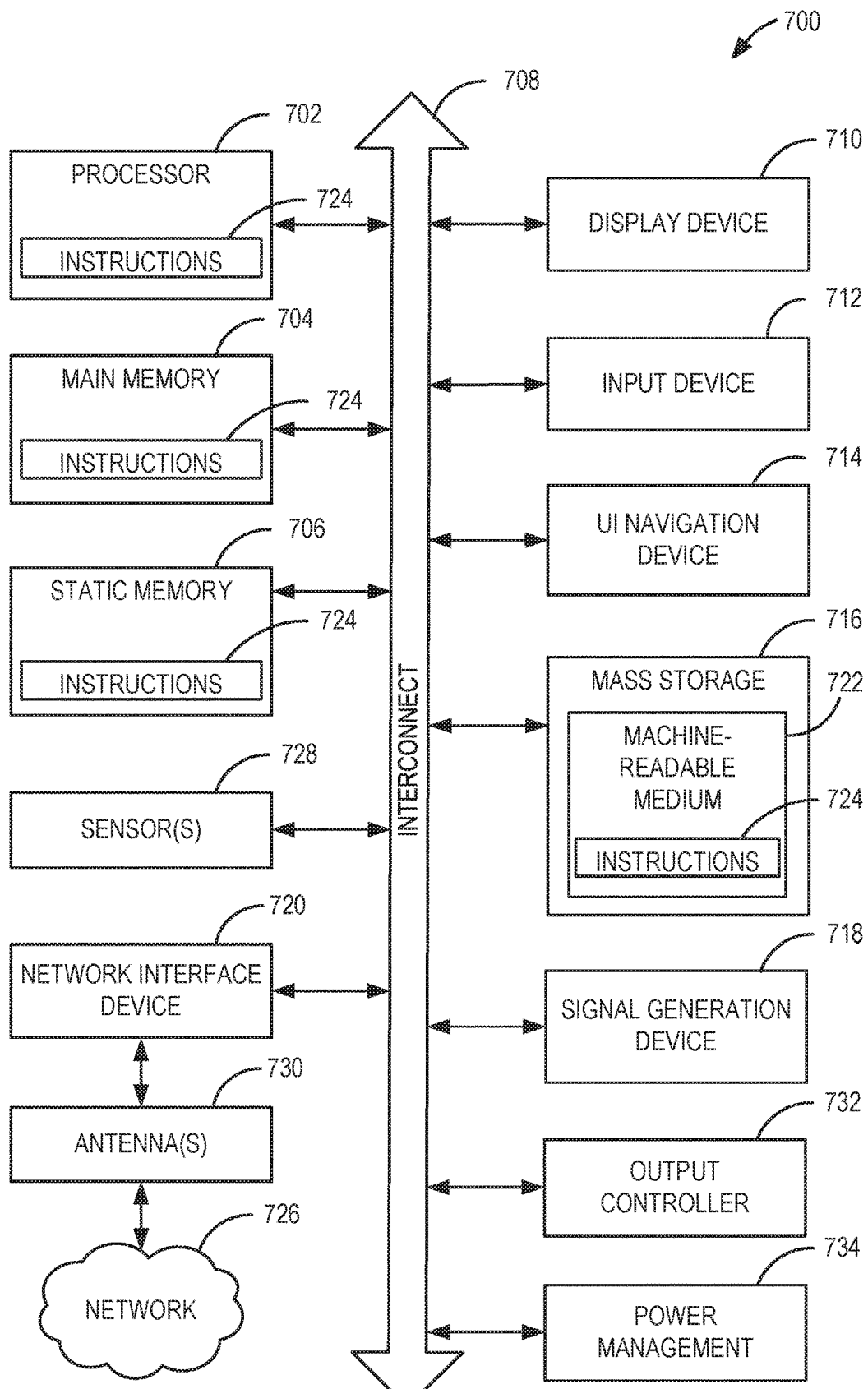
FIG. 7 is a block diagram illustrating an example computer system machine which may be used in association with various embodiments described herein.

FIG. 7 is a block diagram illustrating an example computer system machine 700 upon which any one or more of the methodologies herein discussed can be performed, and which may be used to implement the UEs 101, 102, or any other device described herein. In various alternative embodiments, the computer system machine 700 operates as a standalone device or can be connected (e.g., networked) to other machines. In a networked deployment, the computer system machine 700 can operate in the capacity of either a server or a client machine in server-client network environments, or it can act as a peer machine in peer-to-peer (or distributed) network environments. The computer system machine 700 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single computer system machine 700 is illustrated, the term "machine" shall also be taken to include any collection of machines that individually or jointly execute a set (or multiple sets) of instructions to perform any one or more of the methodologies discussed herein.

The example computer system machine 700 includes a processor 702 (e.g., a central processing unit (CPU), a graphics processing unit (GPU), or both), a main memory 704, and a static memory 706, which communicate with each other via an interconnect 708 (e.g., a link, a bus, etc.). The computer system machine 700 can further include a video display device 710, an alphanumeric input device 712 (e.g., a keyboard), and a user interface (UI) navigation device 714 (e.g., a mouse). In one embodiment, the video display device 710, alphanumeric input device 712, and UI navigation device 714 are a touch-screen display. The computer system machine 700 can additionally include a mass storage device 716 (e.g., a drive unit), a signal generation device 718 (e.g., a speaker), an output controller 732, a power management controller 734, a network interface device 720 (which can include or operably communicate with one or more antennas 730, transceivers, or other wireless communications hardware), and one or more sensors 728, such as a Global Positioning System (GPS) sensor, compass, location sensor, accelerometer, or other sensor.

The mass storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, the static memory 706, and/or the processor 702 during execution thereof by the computer system machine 700, with the main memory 704, the static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions (e.g., the instructions 724) for execution by the machine and that cause the machine to perform any one or more of the methodologies of the present disclosure, or that is capable of storing, encoding, or carrying data structures utilized by or associated with such instructions.

The instructions 724 can further be transmitted or received over a communications network 726 using a transmission medium via the network interface device 720 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (e.g., the instructions 724) embodied in tangible media, such as floppy diskettes, CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computer may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The base station and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Figure 8:
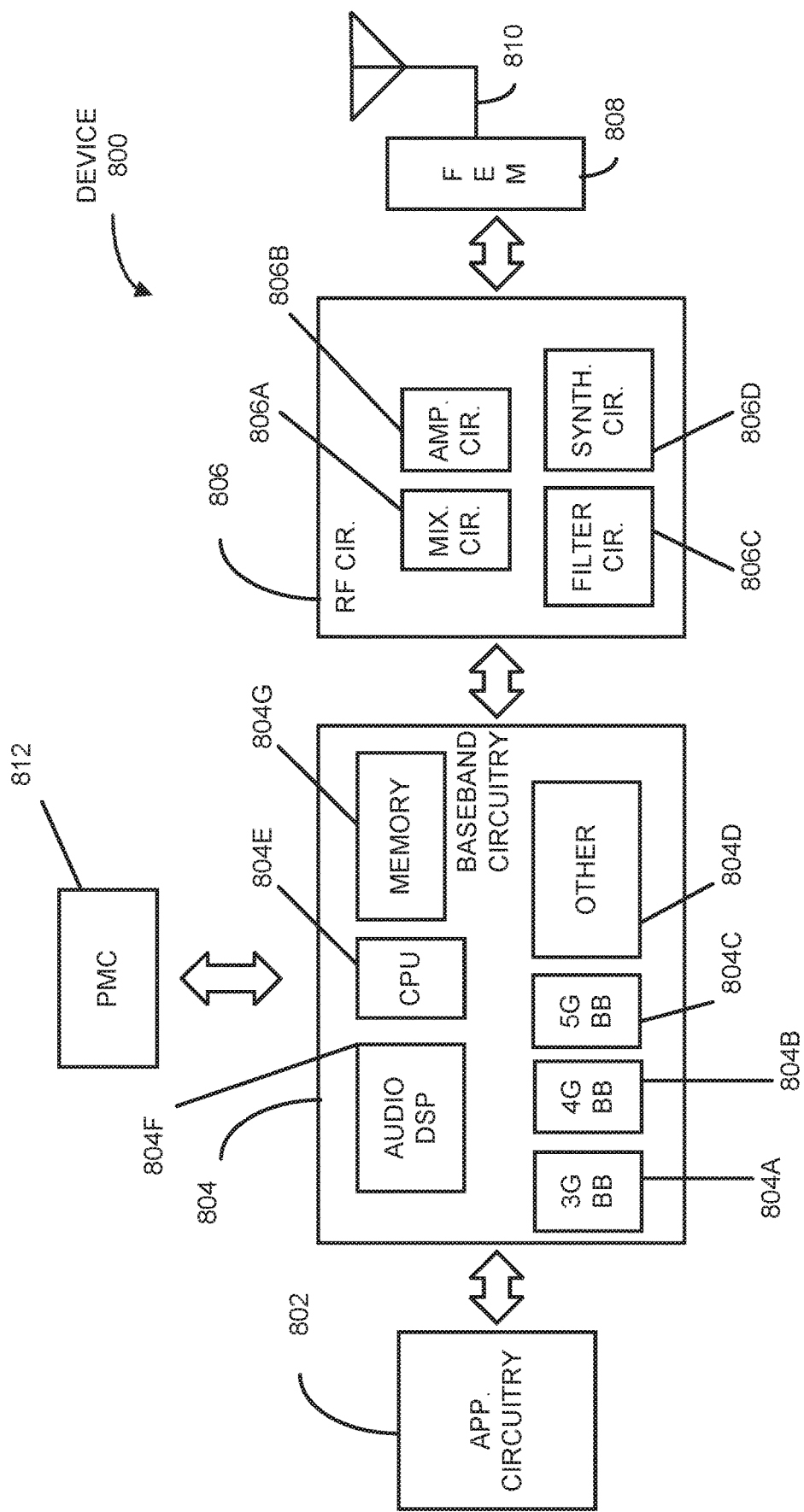
FIG. 8 illustrates aspects of a UE, a wireless apparatus, or a device, in accordance with some example embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include fewer elements (e.g., a RAN node may not utilize the application circuitry 802, and instead include a processor/controller to process IP data received from an EPC). In some embodiments, the device 800 may include additional elements such as, for example, memory/storage, a display, a camera, a sensor, or an input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of the application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. The baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development, or generations to be developed in the future (e.g., second generation (2G), sixth generation (6G), etc.). The baseband circuitry 804 (e.g., one or more of the baseband processors 804A-D) may handle various radio control functions that enable communication with one or more radio networks via the RF circuitry 806. In other embodiments, some or all of the functionality of the baseband processors 804A-D may be included in modules stored in a memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP(s)) 804F. The audio DSP(s) 804F may be or include elements for compression/decompression and echo cancellation, and may include other suitable processing elements in other embodiments. Components of the baseband circuitry 804 may be suitably combined in a single chip or a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMANs), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. The RF circuitry 806 may include a receive signal path which may include circuitry to down-convert RF signals received from the FEM circuitry 808 and provide baseband signals to the baseband circuitry 804. The RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b, and filter circuitry 806c. In some embodiments, the transmit signal path of the RF circuitry 806 may include the filter circuitry 806c and the mixer circuitry 806a. The RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by the synthesizer circuitry 806d. The amplifier circuitry 806b may be configured to amplify the down-converted signals, and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by the filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, separate radio integrated circuitry (IC) circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect, as other types of frequency synthesizers may be suitable. For example, the synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage-controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

The synthesizer circuitry 806d of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (e.g., fLO). In some embodiments, the RF circuitry 806 may include an IQ/polar converter.

The FEM circuitry 808 may include a receive signal path which may include circuitry configured to operate on RF signals received from the one or more antennas 810, amplify the received signals, and provide the amplified versions of the received signals to the RF circuitry 806 for further processing. The FEM circuitry 808 may also include a transmit signal path which may include circuitry configured to amplify signals provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device 800 is included in a UE. The PMC 812 may increase the power conversion efficiency while providing desirable implementation size and heat dissipation characteristics.

FIG. 8 shows the PMC 812 coupled only with the baseband circuitry 804. However, in other embodiments, the PMC 812 may be additionally or alternatively coupled with, and perform similar power management operations for, other components, such as, but not limited to, the application circuitry 802, RF circuitry 806, or FEM circuitry 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low-power state and it performs paging where it periodically wakes up to listen to the network and then powers down again. The device 800 may not receive data in this state; in order to receive data, it transitions back to the RRC_Connected state.

An additional power-saving mode may allow the device 800 to be unavailable to the network for periods longer than a paging interval (ranging from seconds to a few hours). During this time, the device 800 is totally unreachable to the network and may power down completely. Any data sent during this time incurs a large delay, and it is assumed that the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
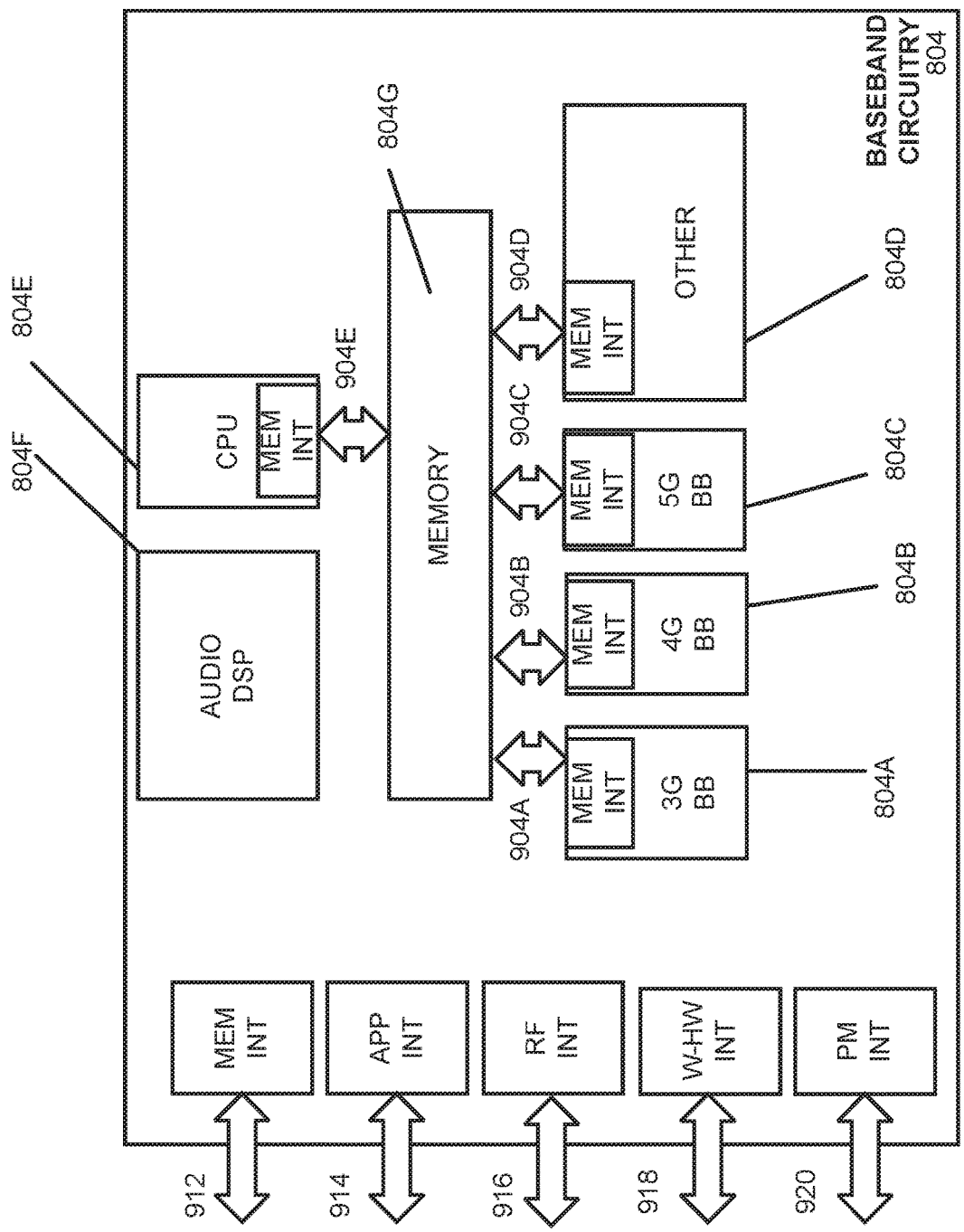
FIG. 9 illustrates example interfaces of baseband circuitry in accordance with some embodiments.

FIG. 9 illustrates example interfaces of the baseband circuitry 804 in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from the RF circuitry 806 of FIG. 8), a wireless hardware connectivity interface 918 (e.g., an interface to send/receive data to/from Near Field Communication (NFC) components. Bluetooth® components (e.g., Bluetooth® Low Energy), Wi-Fi® components, and other communication components), and a power management interface 920 (e.g., an interface to send/receive power or control signals to/from the PMC 812).

Figure 10:
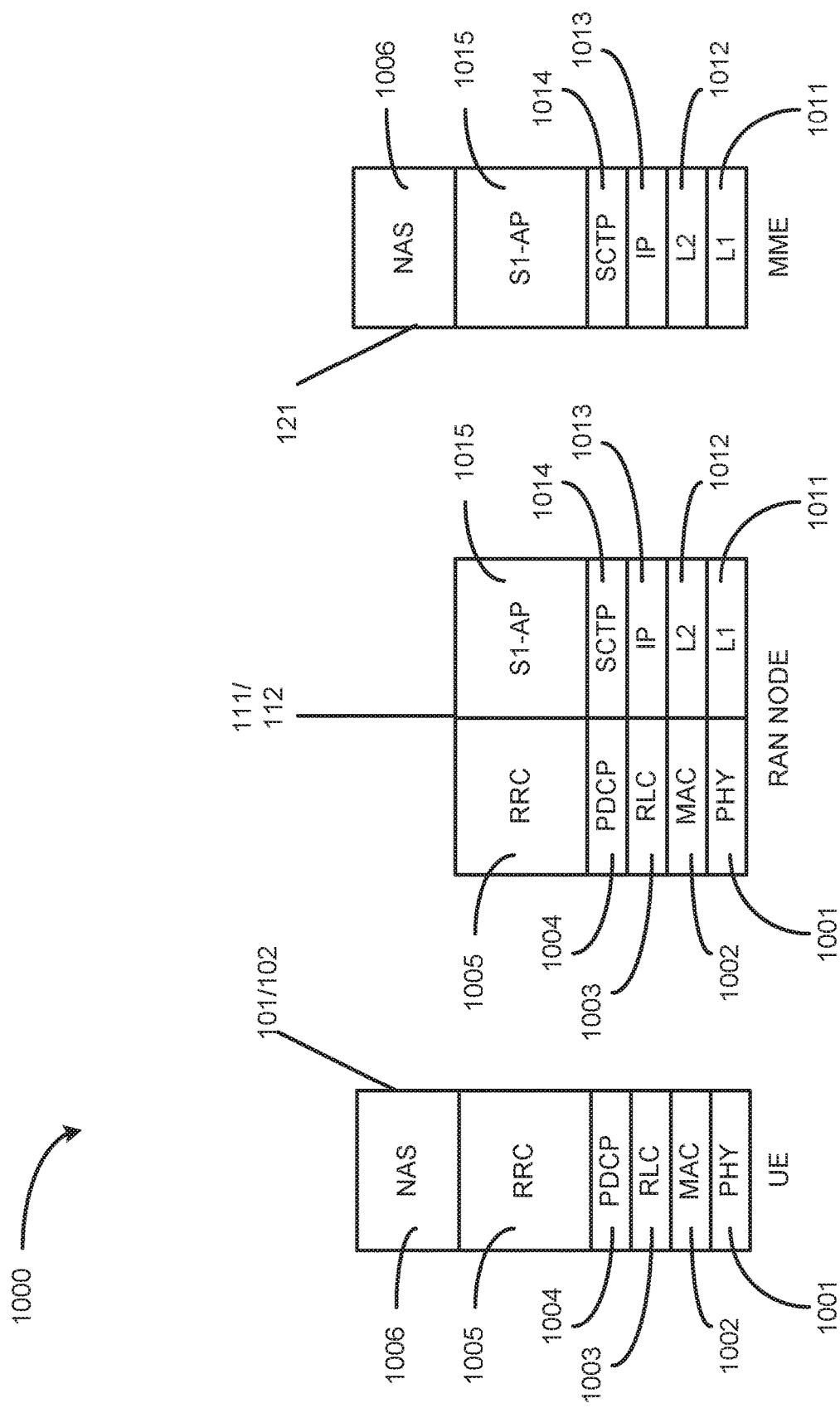
FIG. 10 is an illustration of a control-plane protocol stack in accordance with some embodiments.

FIG. 10 is an illustration of a control-plane protocol stack in accordance with some embodiments. In this embodiment, a control plane 1000 is shown as a communications protocol stack between the UE 101 (or alternatively, the UE 102), the macro RAN node 111 (or alternatively, the LP RAN node 112), and the MME 121.

A PHY layer 1001 may transmit or receive information used by a MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as an RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple-Input Multiple-Output (MIMO) antenna processing.

The MAC layer 1002 may perform mapping between logical channels and transport channels, multiplexing of MAC service data units (SDUs) from one or more logical channels onto transport blocks (TBs) to be delivered to the PHY layer 1001 via transport channels, de-multiplexing of MAC SDUs to one or more logical channels from transport blocks (TBs) delivered from the PHY layer 1001 via transport channels, multiplexing of MAC SDUs onto TBs, scheduling information reporting, error correction through hybrid automatic repeat request (HARQ), and logical channel prioritization.

An RLC layer 1003 may operate in a plurality of modes of operation, including Transparent Mode (TM), Unacknowledged Mode (UM), and Acknowledged Mode (AM). The RLC layer 1003 may execute transfer of upper-layer protocol data units (PDUs), error correction through automatic repeat request (ARQ) for AM data transfers, and concatenation, segmentation, and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1004 may execute header compression and decompression of IP data, maintain PDCP Sequence Numbers (SNs), perform in-sequence delivery of upper-layer PDUs at the re-establishment of lower layers, eliminate duplicates of lower-layer SDUs at the re-establishment of lower layers for radio bearers mapped on RLC AM, cipher and decipher control-plane data, perform integrity protection and integrity verification of control-plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs)) related to the non-access stratum (NAS); broadcast of system information related to the access stratum (AS); paging, establishment, maintenance, and release of an RRC connection between the UE and E-UTRAN (e.g., RRC connection paging, RRC connection establishment, RRC connection modification, and RRC connection release); establishment, configuration, maintenance, and release of point-to-point Radio Bearers; security functions including key management; inter-radio access technology (RAT) mobility; and measurement configuration for UE measurement reporting. Said MIBs and SIBs may comprise one or more information elements (IEs), which may each comprise individual data fields or data structures.

The UE 101 and the macro RAN node 111 may utilize a Uu interface (e.g., an LTE-Uu interface) to exchange control-plane data via a protocol stack comprising the PHY layer 1001, the MAC layer 1002, the RLC layer 1003, the PDCP layer 1004, and the RRC layer 1005.

Non-access stratum (NAS) protocols 1006 form the highest stratum of the control plane 1000 between the UE 101 and the MME 121. The NAS protocols 1006 support the mobility of the UE 101 and the session management procedures to establish and maintain IP connectivity between the UE 101 and the P-GW 123.

An S1 Application Protocol (S1-AP) layer 1015 may support the functions of the S1 interface and comprise Elementary Procedures (EPs). An EP is a unit of interaction between the macro RAN node 111 and the CN 120. The S1-AP layer 1015 services may comprise two groups: UE-associated services and non-UE-associated services. These services perform functions including, but not limited to, E-UTRAN Radio Access Bearer (E-RAB) management, UE capability indication, mobility, NAS signaling transport, RAN Information Management (RIM), and configuration transfer.

A Stream Control Transmission Protocol (SCTP) layer (alternatively referred to as an SCTP/IP layer) 1014 may ensure reliable delivery of signaling messages between the macro RAN node 111 and the MME 121 based, in part, on the IP protocol, supported by an IP layer 1013. An L2 layer 1012 and an L1 layer 1011 may refer to communication links (e.g., wired or wireless) used by the macro RAN node 111 and the MME 121 to exchange information.

The macro RAN node 111 and the MME 121 may utilize an S1-MME interface to exchange control-plane data via a protocol stack comprising the L1 layer 1011, the L2 layer 1012, the IP layer 1013, the SCTP layer 1014, and the S1-AP layer 1015.

Figure 11:
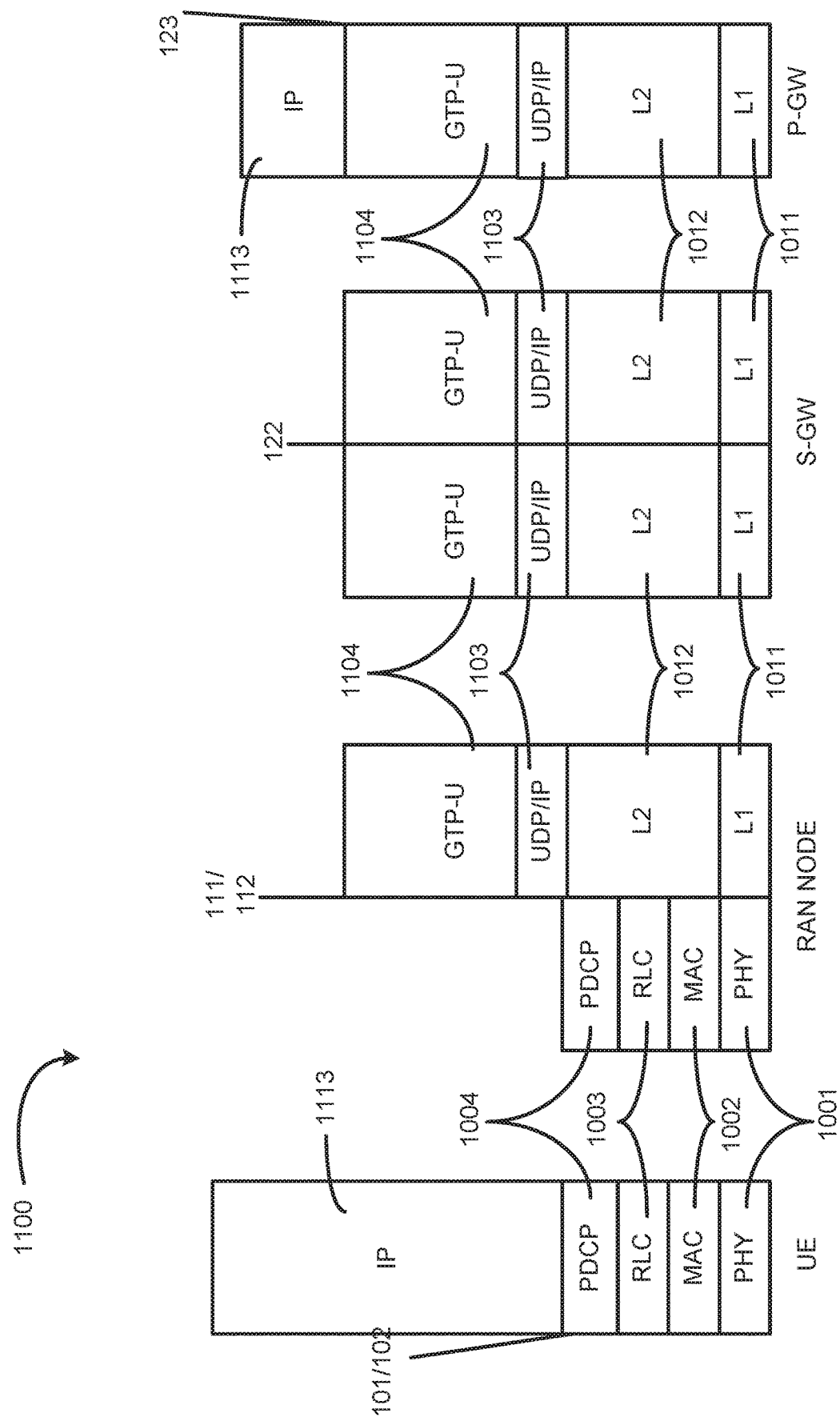
FIG. 11 is an illustration of a user-plane protocol stack in accordance with some embodiments.

FIG. 11 is an illustration of a user-plane protocol stack in accordance with some embodiments. In this embodiment, a user plane 1100 is shown as a communications protocol stack between the UE 101 (or alternatively, the UE 102), the macro RAN node 111 (or alternatively, the LP RAN node 112), the S-GW 122, and the P-GW 123. The user plane 1100 may utilize at least some of the same protocol layers as the control plane 1000. For example, the UE 101 and the macro RAN node 111 may utilize a Uu interface (e.g., an LTE-Uu interface) to exchange user-plane data via a protocol stack comprising the PHY layer 1001, the MAC layer 1002, the RLC layer 1003, and the PDCP layer 1004.

A General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. A UDP and IP security (UDP/IP) layer 1103 may provide checksums for data integrity, port numbers for addressing different functions at the source and destination, and encryption and authentication of the selected data flows. The macro RAN node 111 and the S-GW 122 may utilize an S1-U interface to exchange user-plane data via a protocol stack comprising the L layer 1011, the L2 layer 1012, the UDP/IP layer 1103, and the GTP-U layer 1104. The S-GW 122 and the P-GW 123 may utilize an S5/S8a interface to exchange user-plane data via a protocol stack comprising the L1 layer 1011, the L2 layer 1012, the UDP/IP layer 1103, and the GTP-U layer 1104. As discussed above with respect to FIG. 10. NAS protocols support the mobility of the UE 101 and the session management procedures to establish and maintain IP connectivity between the UE 101 and the P-GW 123.

Figure 12:
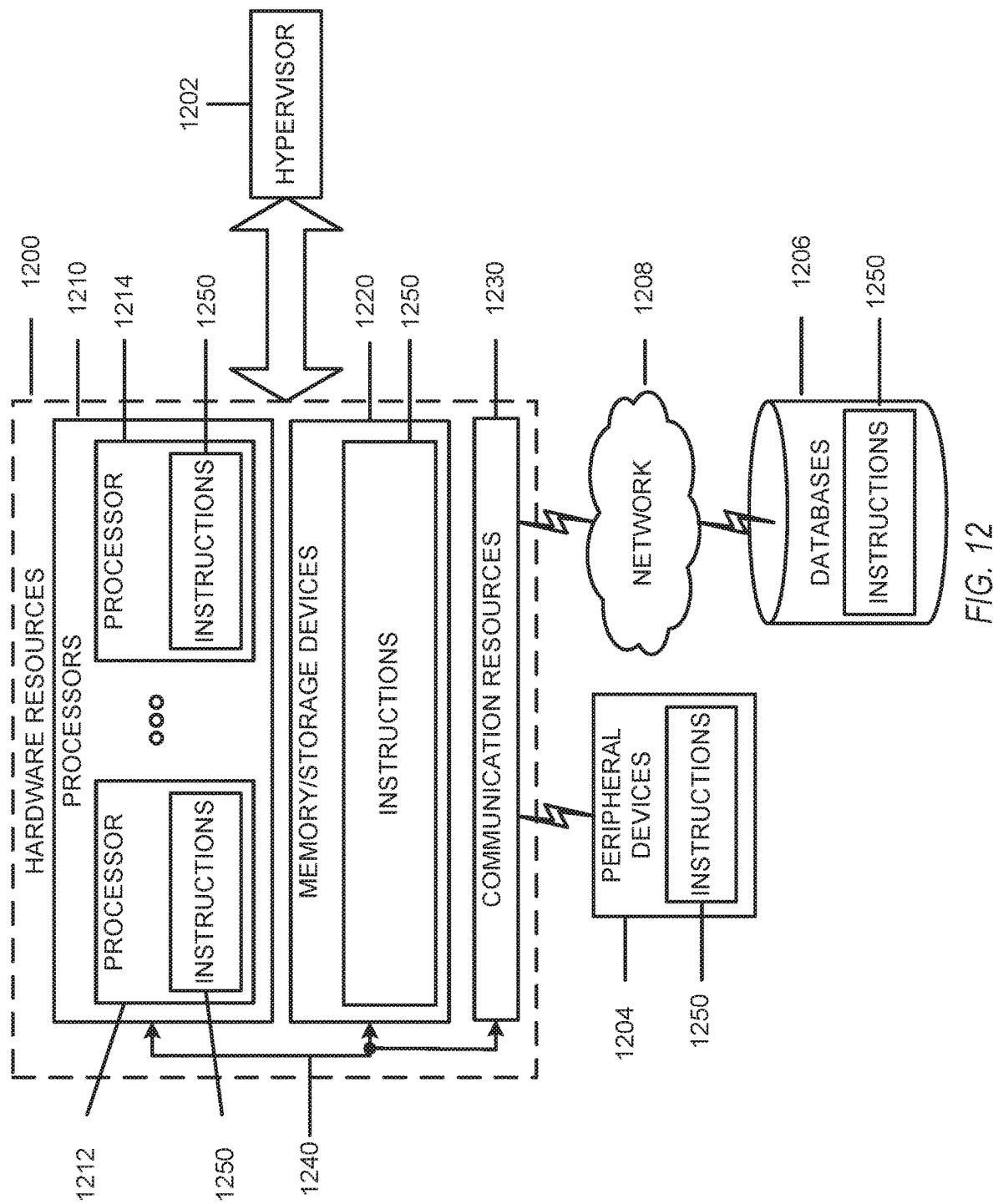
FIG. 12 is a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application-specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components. Bluetooth, components (e.g., Bluetooth® Low Energy), Wi-Fit components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), within the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of the processors 1210, the memory/storage devices 1220, the peripheral devices 1204, and the databases 1206 are examples of computer-readable and machine-readable media.

Figure 13:
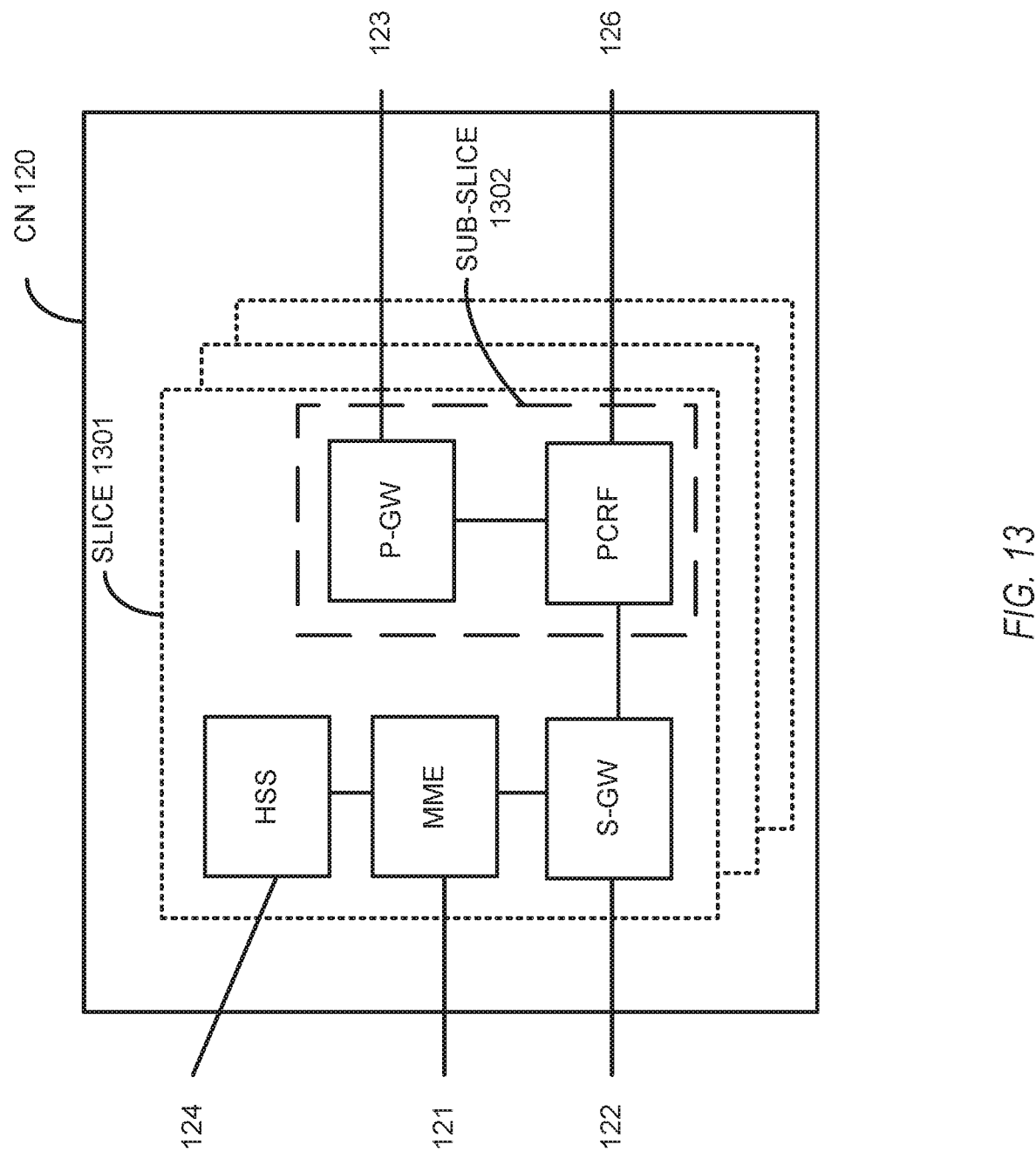
FIG. 13 illustrates components of a core network in accordance with some embodiments.

FIG. 13 illustrates components of the CN 120 in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above-described network node functions via executable instructions stored in one or more computer-readable storage media (described in further detail below). A logical instantiation of the CN 120 may be referred to as a network slice 1301. A logical instantiation of a portion of the CN 120 may be referred to as a network sub-slice 1302 (e.g., the network sub-slice 1302 is shown to include the P-GW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 14:
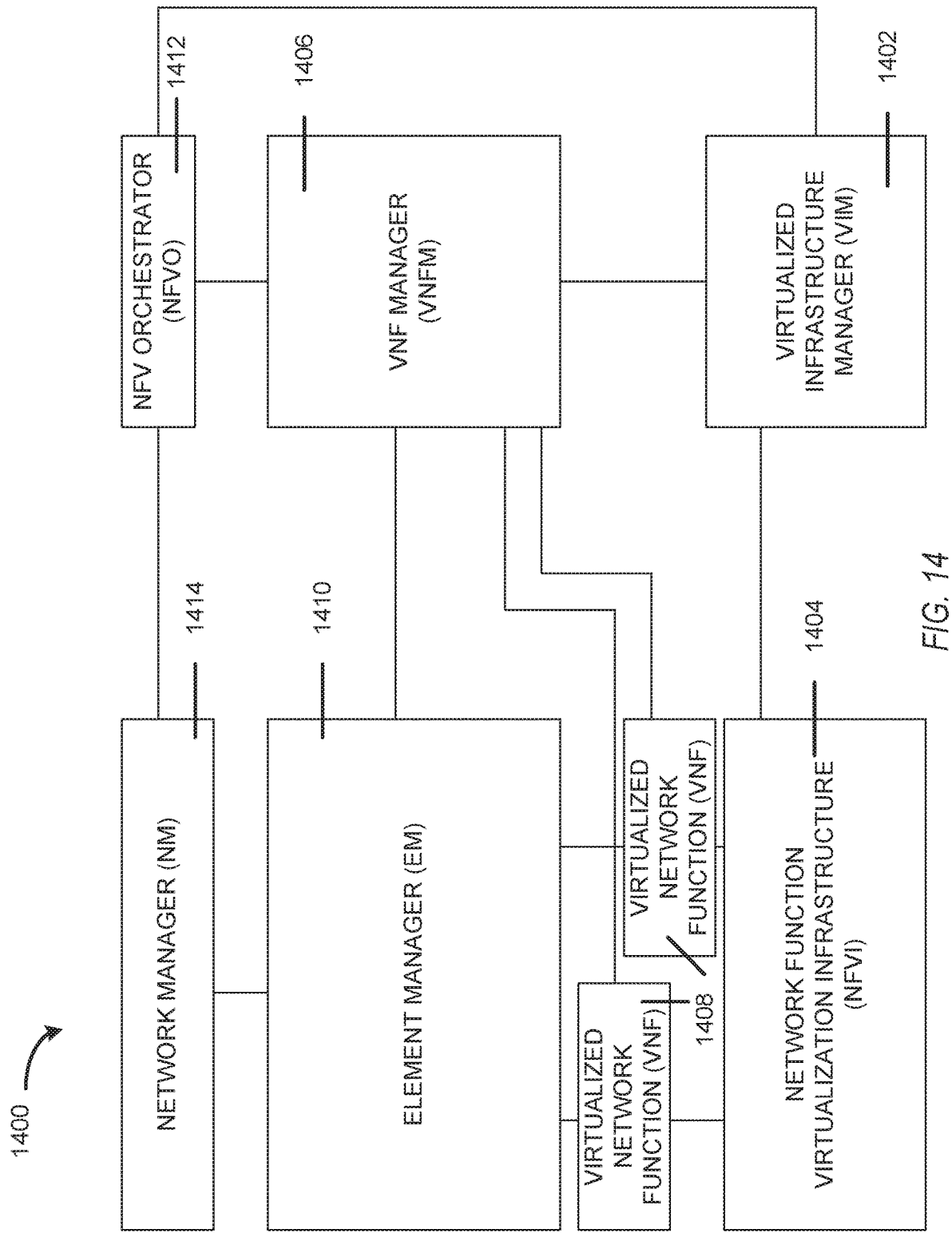
FIG. 14 is a block diagram illustrating components, according to some example embodiments, of a system to support Network Functions Virtualization (NFV).

FIG. 14 is a block diagram illustrating components, according to some example embodiments, of a system 1400 to support NFV. The system 1400 is illustrated as including a virtualized infrastructure manager (VIM) 1402, a network functions virtualization infrastructure (NFVI) 1404, a VNF manager (VNFM) 1406, virtualized network functions (VNFs) 1408, an element manager (EM) 1410, an NFV Orchestrator (NFVO) 1412, and a network manager (NM) 1414.

The VIM 1402 manages the resources of the NFVI 1404. The NFVI 1404 can include physical or virtual resources and applications (including hypervisors) used to execute the system 1400. The VIM 1402 may manage the life cycle of virtual resources with the NFVI 1404 (e.g., creation, maintenance, and teardown of virtual machines (VMs) associated with one or more physical resources); track VM instances; track performance, faults, and security of VM instances and associated physical resources; and expose VM instances and associated physical resources to other management systems.

The VNFM 1406 may manage the VNFs 1408. The VNFs 1408 may be used to execute EPC components/functions. The VNFM 1406 may manage the life cycle of the VNFs 1408 and track performance, faults, and security of the virtual aspects of the VNFs 1408. The EM 1410 may track the performance, faults, and security of the functional aspects of the VNFs 1408. The tracking data from the VNFM 1406 and the EM 1410 may comprise, for example, performance measurement (PM) data used by the VIM 1402 or the NFVI 1404. Both the VNFM 1406 and the EM 1410 can scale up/down the quantity of VNFs 1408 of the system 1400.

The NFVO 1412 may coordinate, authorize, release, and engage resources of the NFVI 1404 in order to provide the requested service (e.g., to execute an EPC function, component, or slice). The NM 1414 may provide a package of end-user functions with the responsibility for the management of a network, which may include network elements with VNFs, non-virtualized network functions, or both (management of the VNFs may occur via the EM 1410).

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While as described herein, non-transitory computer-readable media or a communication device-readable medium may be discussed as a single medium, the term "communication device-readable medium" may include a single medium or multiple media (e.g., a centralized or distributed database, and/or associated caches and servers) configured to store the one or more instructions used by circuitry to implement described operations.

The term "communication device-readable medium" may include any medium that is capable of storing, encoding, or carrying instructions for execution by a communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include non-volatile memory, such as semiconductor memory devices (e.g., EPROM, EEPROM) and flash memory devices; magnetic disks, such as internal hard disks and removable disks; magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP). HTTP, etc.). Example communications networks may include a local area network (LAN), a wide area network (WAN), a packet data network (e.g., the Internet), mobile telephone networks (e.g., cellular networks). Plain Old Telephone Service (POTS) networks, wireless data networks (e.g., IEEE 1002.11 family of standards known as Wi-Fi®, IEEE 1002.16 family of standards known as WiMAX®), IEEE 1002.15.4 family of standards, an LTE family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple-User MIMO techniques. The term "transmission medium" shall be taken to include any intangible medium that is capable of storing, encoding, or carrying instructions for execution by the communication device, and includes digital or analog communications signals or other intangible media to facilitate communication of such software.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system. UE, article, composition, formulation, or process that includes elements in addition to those listed after such a term in a claim is still deemed to fall within the scope of that claim. Moreover, in the following claims, the terms "first." "second," "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A core network device, comprising:
    processing circuitry configured to:
        generate an Access and Mobility Management Function (AMF) configuration update message including a plurality of Transport Network Link (TNL) associations, the AMF configuration update message comprising at least one of a list of TNL associations to add and a list of TNL associations to remove, wherein the list of TNL associations to add includes one or more information elements (IEs) with Internet Protocol (IP) address information; and
        initiate transmission of the AMF configuration update message indicating address information to a Next Generation (NG) Radio Access Network (NG-RAN) node via the list of TNL associations to add; and
    an interface coupled to the processing circuitry and configured to communicate the AMF configuration update message from the processing circuitry to the NG-RAN node.

2. The core network device of claim 1,
    wherein the one or more IEs comprise at least an AMF Transport Layer Associations To Add information element (IE).

3. The core network device of claim 1,
    wherein the one or more IEs comprise at least an AMF Transport Layer Associations To Remove information element (IE).

4. The core network device of claim 1,
    wherein the NG-RAN node selects a TNL address from the plurality of TNL associations to set up an NG interface with the core network device.

5. The core network device of claim 1,
    wherein the processing circuitry is further configured to:
        decode an NG setup message from the NG-RAN node;
        generate an NG setup response message, the NG setup response message comprising an initial set of TNL associations for addresses available to user equipments (UEs) served by the NG-RAN node;
        initiate communication of the NG setup response message to the NG-RAN node; and
        identify an updated list of available addresses as the plurality of TNL associations for the AMF configuration update.

6. The core network device of claim 1,
    wherein the NG-RAN node comprises an NG node B (gNB).

7. The core network device of claim 1,
    wherein the AMF configuration update message is sent by the AMF to transfer updated information for a next generation control plane (NG-C) interface instance.

8. The core network device of claim 1,
    wherein the processing circuitry is further configured to:
        determine a binding update associated with a first TNL binding for a first user equipment (UE) associated with an NG-Radio Access Network (NG-RAN) node, wherein the TNL binding update comprises a TNL information element.

9. The core network device of claim 8,
wherein the TNL information element comprises one or more Internet Protocol (IP) addresses.

10. The core network device of claim 8,
wherein the TNL binding update comprises a request to the NG-RAN node to release a first TNL binding for a first user equipment (UE).

11. The core network device of claim 1,
further comprising a memory coupled to the processing circuitry, the memory configured to store the plurality of TNL associations.

12. A non-transitory computer-readable storage medium comprising instructions that, when executed by one or more processors of a core network device, cause the core network device to perform operations for an Access and Mobility Management Function (AMF) in communication with a Next Generation (NG) Radio Access Network (NG-RAN) node, the operations configuring the core network device to:
generate an AMF configuration update message including a plurality of Transport Network Link (TNL) associations, the AMF configuration update message comprising at least one of a list of TNL associations to add and a list of TNL associations to remove, wherein the list of TNL associations to add includes one or more information elements (IEs) with Internet Protocol (IP) address information; and
initiate transmission of the AMF configuration update message indicating address information to the NG-RAN node via the list of TNL associations to add.

13. The non-transitory computer-readable storage medium of claim 12,
wherein the TNL binding update comprises a request to the NG-RAN node to release a first TNL binding for a first user equipment (UE).

14. The non-transitory computer-readable storage medium of claim 12,
wherein the one or more IEs comprise at least an AMF Transport Layer Associations To Add information element (IE).

15. The non-transitory computer-readable storage medium of claim 12,
wherein the one or more IEs comprise at least an AMF Transport Layer Associations To Remove information element (IE).

16. A method, comprising:
a core network device,
generating an Access and Mobility Management Function (AMF) configuration update message including a plurality of Transport Network Link (TNL) associations, the AMF configuration update message comprising at least one of a list of TNL associations to add and a list of TNL associations to remove, wherein the list of TNL associations to add includes one or more information elements (IEs) with Internet Protocol (IP) address information; and
initiating transmission of the AMF configuration update message indicating address information to a Next Generation (NG) Radio Access Network (NG-RAN) node via the list of TNL associations to add.

17. The method of claim 16,
wherein the one or more IEs comprise at least an AMF Transport Layer Associations To Add IE.

18. The method of claim 16,
wherein the one or more IEs comprise at least an AMF Transport Layer Associations To Remove IE.

19. The method of claim 16,
wherein the NG-RAN node selects a TNL address from the plurality of TNL associations to set up an NG interface with the core network device.

20. An apparatus, comprising:
memory; and
processing circuitry in communication with the memory, wherein the processing circuitry is configured to:
generate an Access and Mobility Management Function (AMF) configuration update message including a plurality of Transport Network Link (TNL) associations, the AMF configuration update message comprising at least one of a list of TNL associations to add and a list of TNL associations to remove, wherein the list of TNL associations to add includes one or more information elements (IEs) with Internet Protocol (IP) address information; and
initiate transmission of the AMF configuration update message indicating address information to a Next Generation (NG) Radio Access Network (NG-RAN) node via the list of TNL associations to add.

21. The apparatus of claim 20,
wherein the one or more IEs comprise at least an AMF Transport Layer Associations To Add IE.

22. The apparatus of claim 20,
wherein the one or more IEs comprise at least an AMF Transport Layer Associations To Remove IE.

23. The apparatus of claim 20,
wherein the NG-RAN node selects a TNL address from the plurality of TNL associations to set up an NG interface with the apparatus.

* * * * *